(12) United States Patent
Shehu

(10) Patent No.: US 9,293,993 B1
(45) Date of Patent: Mar. 22, 2016

(54) MULTIPHASE BUCK CONVERTER CONTROLLER WITHOUT PID COMPENSATOR OR COMPENSATED ERROR AMPLIFIER IN THE CONTROL LOOP

(71) Applicant: Edvin Shehu, Kirkland, WA (US)

(72) Inventor: Edvin Shehu, Kirkland, WA (US)

( * ) Notice: Subject to any disclaimer, the term of this patent is extended or adjusted under 35 U.S.C. 154(b) by 287 days.

(21) Appl. No.: 14/168,128

(22) Filed: Jan. 30, 2014

(51) Int. Cl.
*H02M 3/156* (2006.01)
*H02M 3/158* (2006.01)

(52) U.S. Cl.
CPC .................................. *H02M 3/1588* (2013.01)

(58) Field of Classification Search
CPC ............................ H02M 3/156; H02M 3/1584
USPC .................................................. 323/272, 282
See application file for complete search history.

(56) References Cited

U.S. PATENT DOCUMENTS

| | | | |
|---|---|---|---|
| 4,306,529 A | 12/1981 | Chiesa et al. | |
| 4,649,484 A | 3/1987 | Herzog et al. | |
| 6,922,044 B2 | 7/2005 | Walters et al. | |
| 8,452,465 B1 | 5/2013 | Sinha et al. | |
| 8,498,768 B2 | 7/2013 | Goto et al. | |
| 2004/0051510 A1* | 3/2004 | Saggini | H02M 3/157 323/282 |
| 2009/0146622 A1* | 6/2009 | McDonald | H02M 3/1584 323/238 |
| 2013/0027009 A1* | 1/2013 | Tang | H02M 3/1584 323/271 |
| 2013/0057242 A1 | 3/2013 | Zambetti et al. | |
| 2013/0249508 A1 | 9/2013 | Rahimi et al. | |
| 2014/0032942 A1* | 1/2014 | Takehara | H02M 3/156 713/300 |
| 2014/0176097 A1* | 6/2014 | Huang | H02M 3/1584 323/272 |
| 2015/0207400 A1* | 7/2015 | Shenoy | H02M 3/1584 323/213 |
| 2015/0236595 A1* | 8/2015 | Babazadeh | H02M 3/1584 323/272 |

* cited by examiner

*Primary Examiner* — Jeffrey Sterrett
(74) *Attorney, Agent, or Firm* — Malhotra Law Firm, PLLC; Deepak Malhotra

(57) ABSTRACT

A controller for a multiphase buck converter is provided having reduced delay and reduced output capacitance, in various embodiments. A multiphase buck converter including the controller is also provided. Methods of controlling a multiphase buck converter are also provided. Computers and vehicles including multiphase buck converters are also provided.

20 Claims, 7 Drawing Sheets

US 9,293,993 B1

MULTIPHASE BUCK CONVERTER CONTROLLER WITHOUT PID COMPENSATOR OR COMPENSATED ERROR AMPLIFIER IN THE CONTROL LOOP

TECHNICAL FIELD

The technical field comprises DC to DC power converters; digital and analog controllers for a DC to DC power converter; computers, tablets, smartphones, and smart appliances incorporating DC to DC power converters; and vehicles incorporating DC to DC power converters.

BACKGROUND

A buck converter is a step-down DC to DC converter. It is a switched-mode power supply that typically uses two switches, an inductor and a capacitor.

A multiphase buck converter is a DC to DC converter that provides multiple low voltage and high current outputs, which are required by processors, memory banks, and ASICs, for example. The multiphase buck converter has interleaved phases, and a multiphase controller provides control signals to the buck converter to control those phases.

The simplest way to reduce the voltage of a DC supply is to use a linear regulator. However, linear regulators waste energy by dissipating excess power as heat. Buck converters, on the other hand, can be more efficient. This efficiency and reduced heat make them useful for tasks such as converting the main voltage in a system down to a lower voltage required by a processor included in the system.

One of the biggest challenges in design of power supplies for systems including processors is handling transient response requirements. For example, a processor can demand in excess of 100 A of current in a matter of nanoseconds. A power supply has to maintain output voltage within a very tight tolerance. Such transient response requirements put a huge burden on the power supply.

The most common way that multiphase buck converters operate is in voltage mode fixed frequency operation. A proportional-integral-derivative (PID) compensator controls the converter. See, for example, U.S. Pat. No. 7,245,512 to Leung, incorporated herein by reference.

SUMMARY

Various embodiments provide a controller for a multiphase buck converter having reduced delay and reduced output capacitance.

Some embodiments provide a controller for a multiphase buck converter, configured to control a predetermined number of power stages defining an output voltage, the controller comprising a voltage supply input; a control loop including a feedback voltage input configured to receive a feedback voltage proportional to output voltage; a setpoint voltage input configured to receive a setpoint voltage that represents desired output voltage; and a ramp generator configured to generate a repeating ramp signal that ramps from a first voltage to the feedback voltage then resets to the first voltage, the ramp generator reaching the feedback voltage at faster intervals when the feedback voltage drops relative to the setpoint voltage, the power stages being turned on more frequently responsive to the ramp generator reaching the feedback voltage at faster intervals; wherein no PID compensator or compensated error amplifier is used in the control loop between the output voltage and the feedback voltage input.

Some embodiments provide a computer including a processor and a memory coupled to the processor, the computer including the multiphase buck converter coupled to power the processor and the memory.

Some embodiments provide a vehicle having an engine, a battery, a sensor configured to sense an operating parameter of the engine, and an engine control computer coupled to the sensor and configured to adjust operation of the engine in response to the sensed parameter, the engine control computer including a processor and a memory coupled to the processor, the engine control computer including the multiphase buck converter coupled to receive power from the battery and coupled to supply power to the processor and the memory.

Some embodiments provide a method of controlling a multiphase buck converter configured to control a predetermined number of power stages defining an output voltage, the method comprising receiving an input voltage from a voltage supply; receiving a feedback voltage signal, at a feedback voltage input, proportional to output voltage; receiving a setpoint voltage signal that represents desired output voltage; generating a repeating ramp signal that ramps from a first voltage to the feedback voltage then resets to the first voltage, the ramp reaching the feedback voltage at faster intervals when the feedback voltage drops relative to the setpoint voltage; and turning on the power stages more frequently responsive to the ramp generator reaching the feedback voltage at faster intervals; wherein no PID compensator or compensated error amplifier is used between the output voltage and the feedback voltage input.

Some embodiments provide a controller for a multiphase buck converter, configured to control a predetermined number of power stages defining an output voltage, the controller comprising a voltage supply input; a control loop including a feedback voltage input configured to receive a feedback voltage proportional to output voltage; a setpoint voltage input configured to receive a setpoint voltage that represents desired output voltage; circuitry configured to subtract the DC error voltage from the setpoint voltage to define a low voltage; a ramp generator configured to generate a periodic repeating ramp signal that ramps from the low voltage to the feedback voltage then resets to the low voltage; a phase clock coupled to the ramp generator and configured to generate a pulse each time the repeating ramp signal resets to the low voltage; a phase counter coupled to the phase clock and configured to count each time a pulse is generated by the phase clock and to restart the count when the predetermined number is reached; and a time on block having an input coupled to the phase counter and configured to turn on respective of the power stages when the counter is at predetermined count values; wherein no PID compensator or compensated error amplifier is used in the control loop between the output voltage and the feedback voltage input.

BRIEF DESCRIPTION OF THE VIEWS OF THE DRAWINGS

FIG. 2 shows two phase operation for simplicity and clarity. The controller can run as many phases as needed by the application.

FIG. 3 shows two phase operation for simplicity and clarity. The controller can run as many phases as needed by the application.

DETAILED DESCRIPTION OF THE ILLUSTRATED EMBODIMENTS

Multiphase buck converters operating in voltage mode fixed frequency operation do not have the fastest transient response, because of two reasons.

The first reason is the PID compensator itself. It includes an error amplifier with a negative feedback network of capacitors and resistors. This compensation network introduces delay when the feedback voltage changes, because the feedback network capacitors have to be charged and discharged by the error amplifier. The second reason is the fixed frequency operation. The buck converter controller will not issue another drive pulse until the fixed frequency phase clock asks for one. Since the phase clock comes at pre-determined time intervals, the converter output capacitance has to supply the load current during a transient event for the entire interval between phase clock pulses. This interval adds an extra delay to the response of a normal PID controlled buck converter.

There are also other architectures. See, for example, U.S. Pat. No. 6,922,044 to Walters, incorporated herein by reference, and U.S. Patent Publication 20130057242A1 to Zambetti et al, incorporated herein by reference. Both of these disclosures describe ways to attempt to minimize the delay from the phase clock pulses coming at pre-determined intervals. Both architectures described in the disclosures, however, use a compensated error amplifier or a PID compensator in the control loop. Therefore, they both suffer from the delay introduced by the compensated error amplifier or the PID compensator.

The controller described herein minimizes delay, for reasons that will become apparent.

Figure 1:
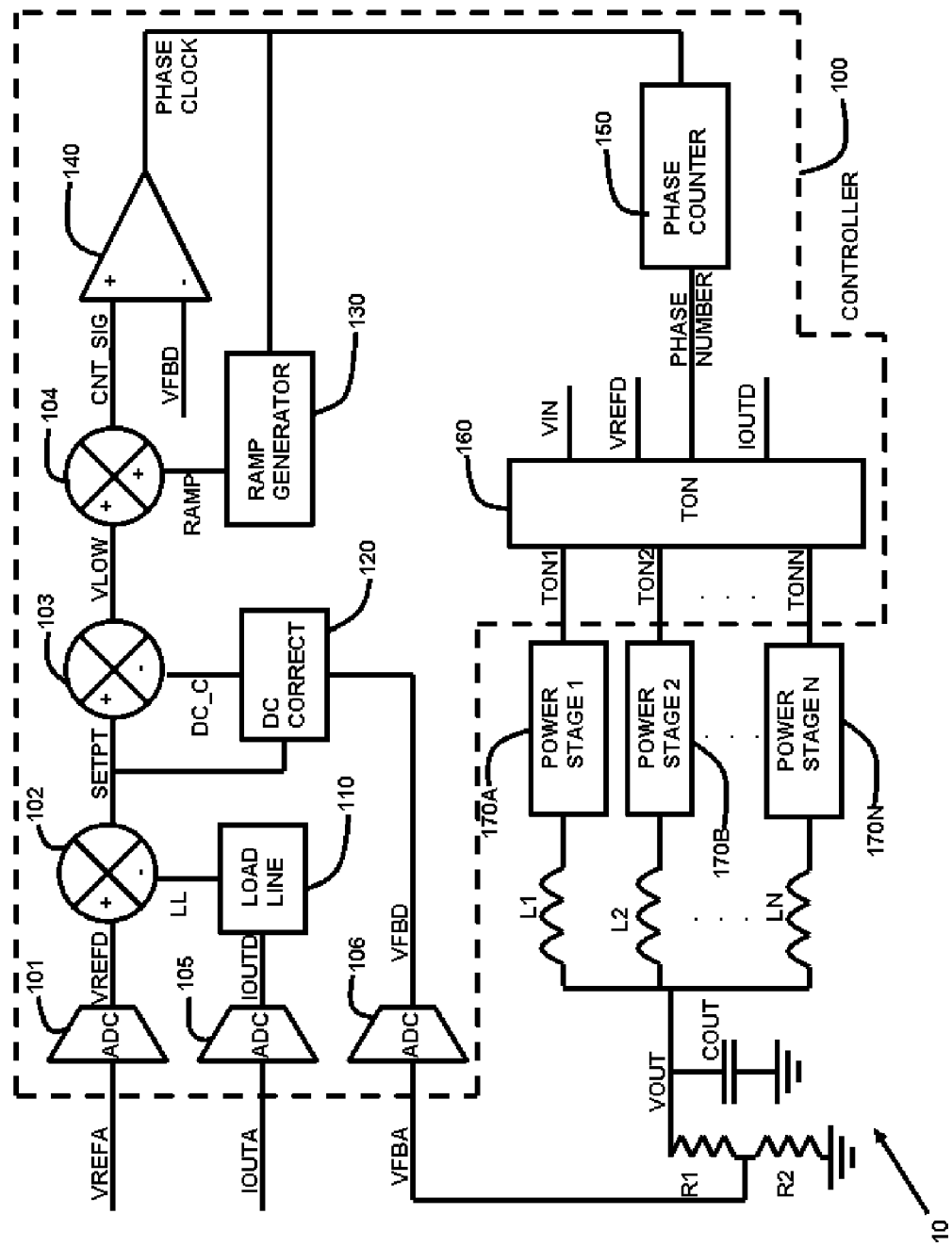
FIG. 1 is a circuit block diagram of a controller and a multiphase buck converter, in accordance with various embodiments.
Figure 2:
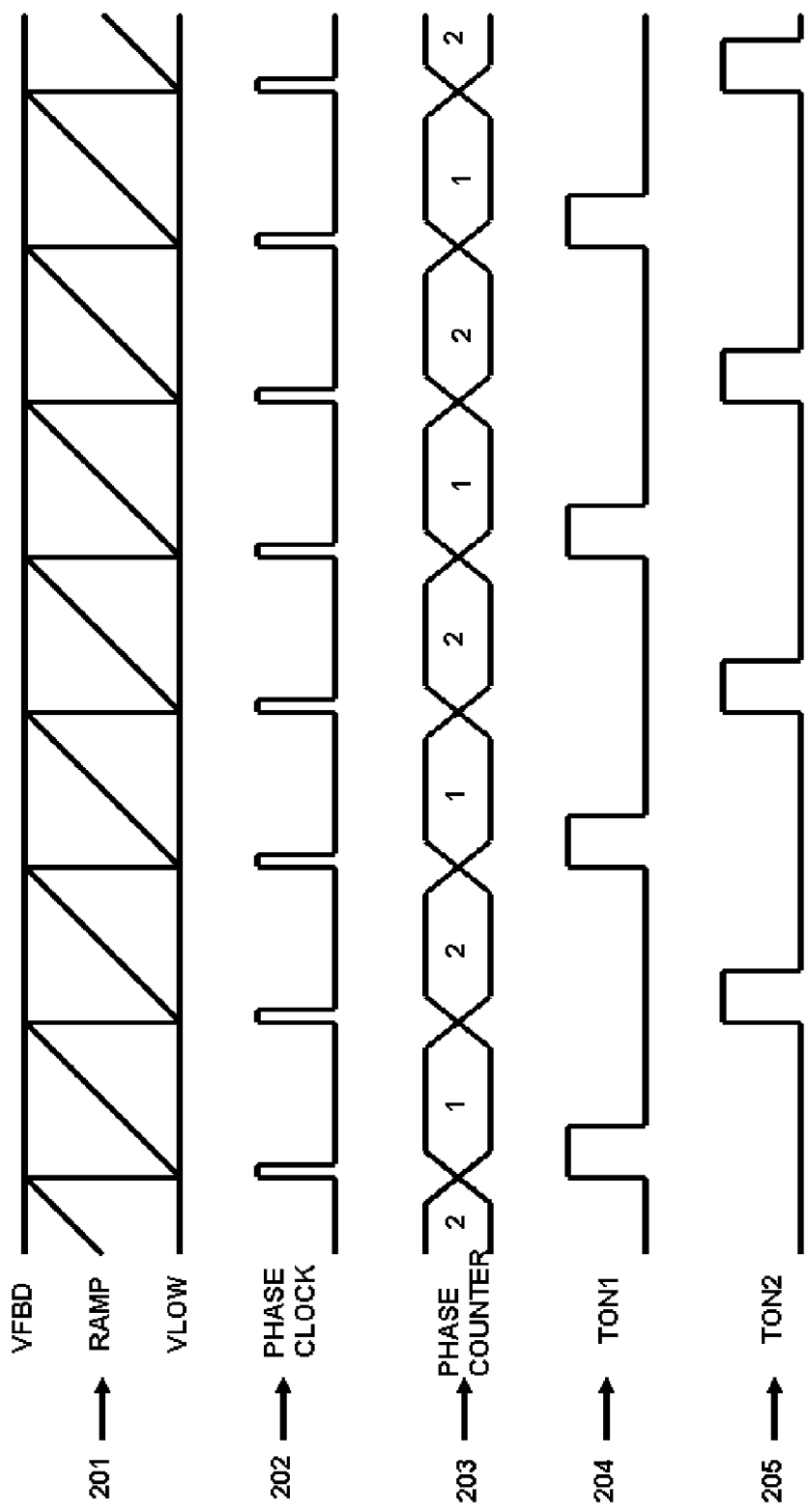
FIG. 2 is a timing diagram illustrating timings of various signals of the controller of FIG. 1, during steady state operation, in accordance with various embodiments.
Figure 3:
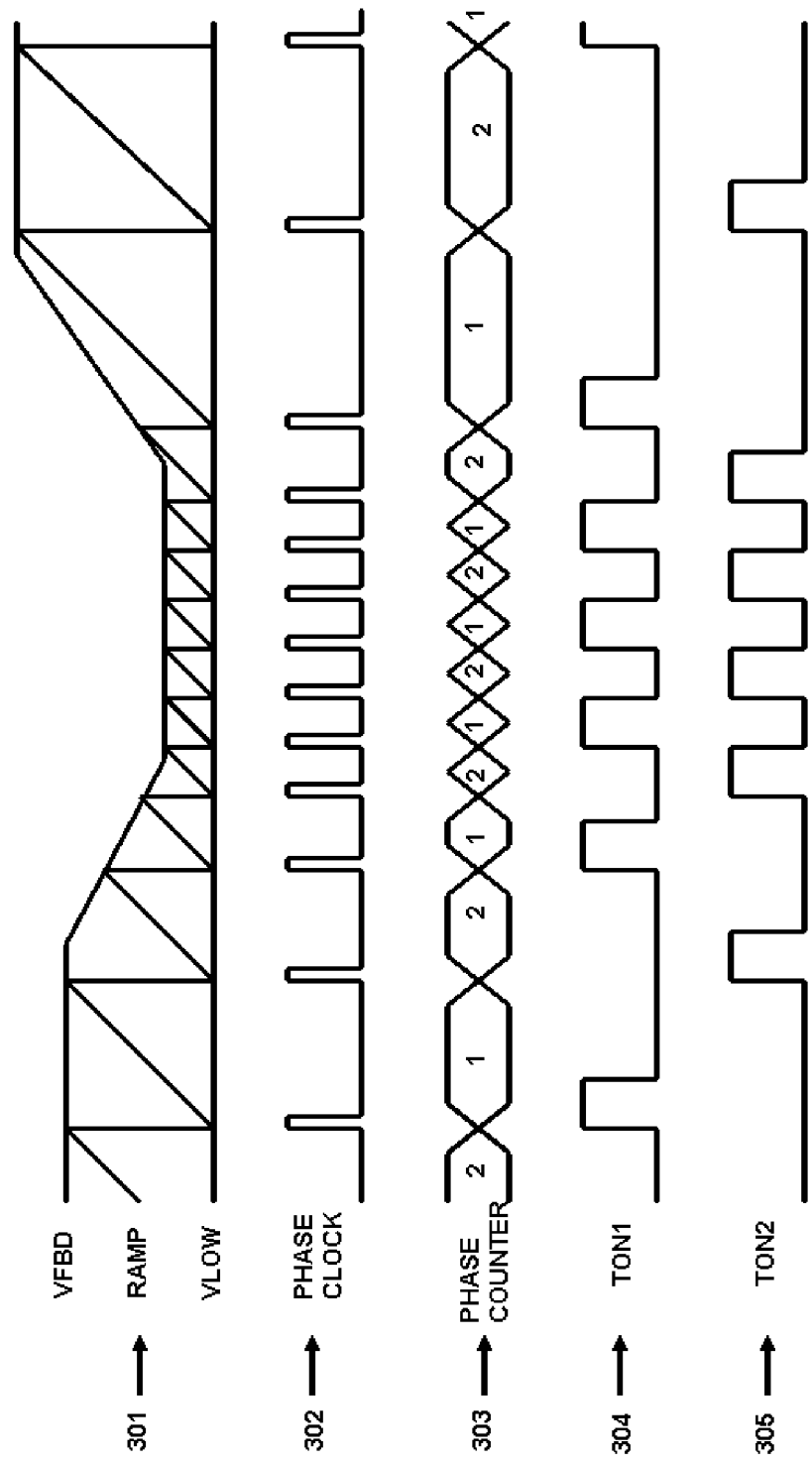
FIG. 3 is a timing diagram illustrating timings of various signals of the controller of FIG. 1, during transient operation, in accordance with various embodiments.

FIG. 1 shows a voltage regulator system 10 in accordance with various embodiments. The system 10 includes a controller 100 running a multiphase buck converter. FIGS. 2 and 3 show operation of a two phase buck converter for simplicity. It is by no means a limitation of the controller. The controller can run as many phases as an application requires.

The input signals to the controller are the reference voltage VREFA, the converter output current IOUTA, the feedback signal VFBA and the input voltage VIN. The signals VREFA, IOUTA, VFBA, and VIN are analog signals. In the illustrated embodiment, the controller 100 includes analog-to-digital converters 101, 105, and 106 that digitize the signals VREFA, IOUTA, VFBA, respectively, into VREFD, IOUTD and VFBD. In some modern processors the reference is passed as a digital code, in which case block 101 can be omitted or is a decoder that transforms the digital code for compatibility between the controller 100 and a processor.

The IOUTA signal is a load current signal. It is generally sensed through the inductor DCR (DC resistance) or through a current sense resistor. IOUTD is the digitized version of IOUTA. The controller 100 includes LOAD LINE circuitry 110 in the illustrated embodiment. IOUTD is used in the LOAD LINE block 110 to determine the load line signal LL. The load line signal LL is proportional to the output current. LL is generated by the LOAD LINE block 110, in the illustrated embodiment, by multiplying IOUTD with an appropriate factor to set the desired converter output impedance. This factor is input by the user in various embodiments. Some processor manufacturers specify an output impedance. That is the only reason why a load line signal is used.

The controller 100 further includes subtractor circuitry 102 in the illustrated embodiment. Subtractor block 102 subtracts the LL signal from the digitized reference signal VREFD to create a setpoint signal SETPT. This implements the load line, which is a very common requirement for processor power. In other embodiments, the blocks 105, 102, and 110 are omitted, in which case SETPT is the same as VREFD.

The controller 100 further includes DC CORRECT circuitry 120, in various embodiments, that compares the feedback voltage signal VFBD against the setpoint signal SETPT and generates a correction signal DC_C.

The controller 100 further includes a RAMP GENERATOR 130 that generates a RAMP signal.

The controller 100 further includes subtractor circuitry 103, in various embodiments. One of the inputs to the subtractor 103 is the signal DC_C. A signal VLOW signal is generated by subtracting the DC_C signal from the SETPT signal through subtractor block 103. DC_C is the amplitude of the RAMP signal. The goal is to keep the feedback signal VFBD the same as the setpoint signal SETPT. If the DC_C signal were not subtracted from SETPT the VFBD signal would be higher than SETPT by the amplitude of RAMP, which would result in inaccurate DC regulation.

The controller 100 further includes adder circuitry 104, in various embodiments, and a comparator 140. The adder block 104 adds the RAMP signal and the VLOW signal to produce a control signal CNT_SIG. The control signal CNT_SIG is compared against the feedback signal VFBD through comparator 140 to produce a series of narrow pulses called PHASE CLOCK. In the illustrated embodiment, the comparator 140 is a digital comparator. The controller 100 further includes PHASE COUNTER circuitry 150, in various embodiments. The PHASE CLOCK pulse train is passed to the PHASE COUNTER block 150. The PHASE COUNTER 150 outputs a PHASE NUMBER. The PHASE COUNTER 150 increments the phase number by one when it receives a PHASE CLOCK pulse. When the PHASE COUNTER 150 reaches the maximum number of phases, it starts again from the first phase. During operation, the PHASE NUMBER goes 1→2→ . . . →N→1→2→ . . . →N→1 and so on, in some embodiments. In other embodiments, the PHASE NUMBER counts down from a maximum number of phases down to 1 and then goes back to N. In other embodiments, a different counting order is used or random numbers are used for PHASE NUMBER as long as the numbers are not repeated during a switching cycle.

The controller circuitry 100 further includes time on TON circuitry 160. The PHASE NUMBER is passed to the TON block 160. The TON block generates a drive pulse for the phase that matches PHASE NUMBER, in the illustrated embodiment. If PHASE NUMBER is 1, TON generates a drive pulse for phase 1 of the converter, or TON1. If PHASE NUMBER is 2, TON generates a drive pulse for phase 2 of the converter, or TON2. If PHASE NUMBER is N, TON generates a drive pulse for phase N of the converter, or TONN.

The drive pulse duration TON1/TON2/.../TONN that the TON block 160 generates is calculated by using the input signal VIN, the reference signal VREFD, the desired steady state switching frequency and, in some embodiments, by using the output current signal IOUTD. Small corrections needed to maintain output voltage regulation to specification are done by slight changes of the switching frequency. If VREF rises, the duration of drive pulses TON1/TON2/.../TONN is increased. If VREF falls, the duration of drive pulses TON1/TON2/.../TONN is decreased. If VIN rises or falls, the duration of drive pulses TON1/TON2/.../TONN is decreased or increased respectively. The output current signal IOUTD is used, in some embodiments, to maintain the steady state switching frequency constant when the converter is providing high output current. The converter power loss increases with increasing output current. The loop responds by increasing the switching frequency in order to provide the excess power that is needed and to maintain the output voltage within tight tolerance. Slightly increasing the drive pulse duration when the output current increases maintains the steady state switching frequency constant throughout the entire output current range.

The system 10 further includes power stages POWER STAGE 1, POWER STAGE 2, ... up to POWER STAGE N (e.g., 170A, 170B, ... up to 170N), output inductors L1, L2, ... up to LN, output capacitance COUT, and voltage divider resistors R1 and R2. The power stages POWER STAGE 1 to POWER STAGE N drive the output inductors L1 to LN, respectively, when they receive the corresponding drive pulses TON1 to TONN. The output inductors and the output capacitance COUT filter the pulses from the power stages and generate the output voltage.

FIG. 2 shows operation of the controller 100 during steady state. Steady state is when operating conditions of the converter do not change and the converter runs normally. 201 is a timing diagram of RAMP versus time. 202 is a timing diagram of PHASE CLOCK versus time. 203 is a timing diagram of phase counter versus time. 204 is a timing diagram of TON1 versus time, and 205 is a timing diagram of TON2 versus time.

When CNT_SIG (VLOW+RAMP) reaches VFBD, RAMP is reset to 0 as illustrated in 201, and as a result CNT_SIG is reset back to VLOW. At the same time a narrow pulse at PHASE CLOCK is created, as illustrated in 202. This pulse updates the PHASE COUNTER 150, as illustrated in 203. When the PHASE COUNTER 150 is updated, the TON block 160 generates the drive pulse to the corresponding POWER STAGE 170A or 170B. In this case, if PHASE COUNTER is 1, TON1 drive pulse is generated to power stage 170A, as illustrated in 204. If PHASE COUNTER is 2, TON2 drive pulse is generated to power stage 170B, as illustrated in 205.

FIG. 3 shows how the controller 100 responds during a transient event. Transient event occurs when the operating conditions change such that they force a change, such as an abrupt change, in the output voltage. Such events are commonly caused by load changes or VIN changes, for example. 301 is a timing diagram of RAMP versus time. 302 is a timing diagram of PHASE CLOCK versus time. 303 is a timing diagram of phase counter versus time. 304 is a timing diagram of TON1 versus time, and 305 is a timing diagram of TON2 versus time. The transient event occurs in the time period illustrated in FIG. 3.

The output capacitance COUT needs more current to bring the output voltage VOUT higher when VFBD begins to dip. When VFBD is closer to VLOW, RAMP reaches VFBD faster and more frequently as illustrated in 301 in FIG. 3. The frequency of the PHASE CLOCK pulses output from comparator 140 increases as illustrated in 302. This makes the PHASE COUNTER 150 update PHASE NUMBER more frequently as illustrated in 303.

This results in the drive pulses TON1 and TON2 being issued more frequently as illustrated in 304 and 305. This increases the current in the output inductors L1 and L2 that supply the output capacitance increasing the output voltage VOUT as intended. The process is reversed when VFBD rises. The PHASE CLOCK frequency decreases, which makes the drive pulses TON1 and TON2 get issued less frequently. This decreases the current in the output inductors, which lowers the output voltage as intended.

The controller architecture described above lends itself well to digital implementation, if desired for some embodiments. The following describes how the relevant signals are generated.

The reference signal VREFA is the signal that commands the power supply to produce a certain output voltage. In embodiments using modern microprocessors, the reference signal is passed on to a controller via a digital communication protocol as bits. These bits are a digital code that corresponds to a specific output voltage. In these embodiments, analog-to-digital converter (ADC) 101 is not necessary and is omitted. VREFD is generated by a simple decoder in these embodiments.

IOUTA is the sensed converter output current. The most common way to sense output current is to use inductor DC resistance (DCR) sensed at inductors L1 through LN. Another way is to use dedicated current sense resistors. IOUTD is the digitized version of IOUTA.

Figure 4:
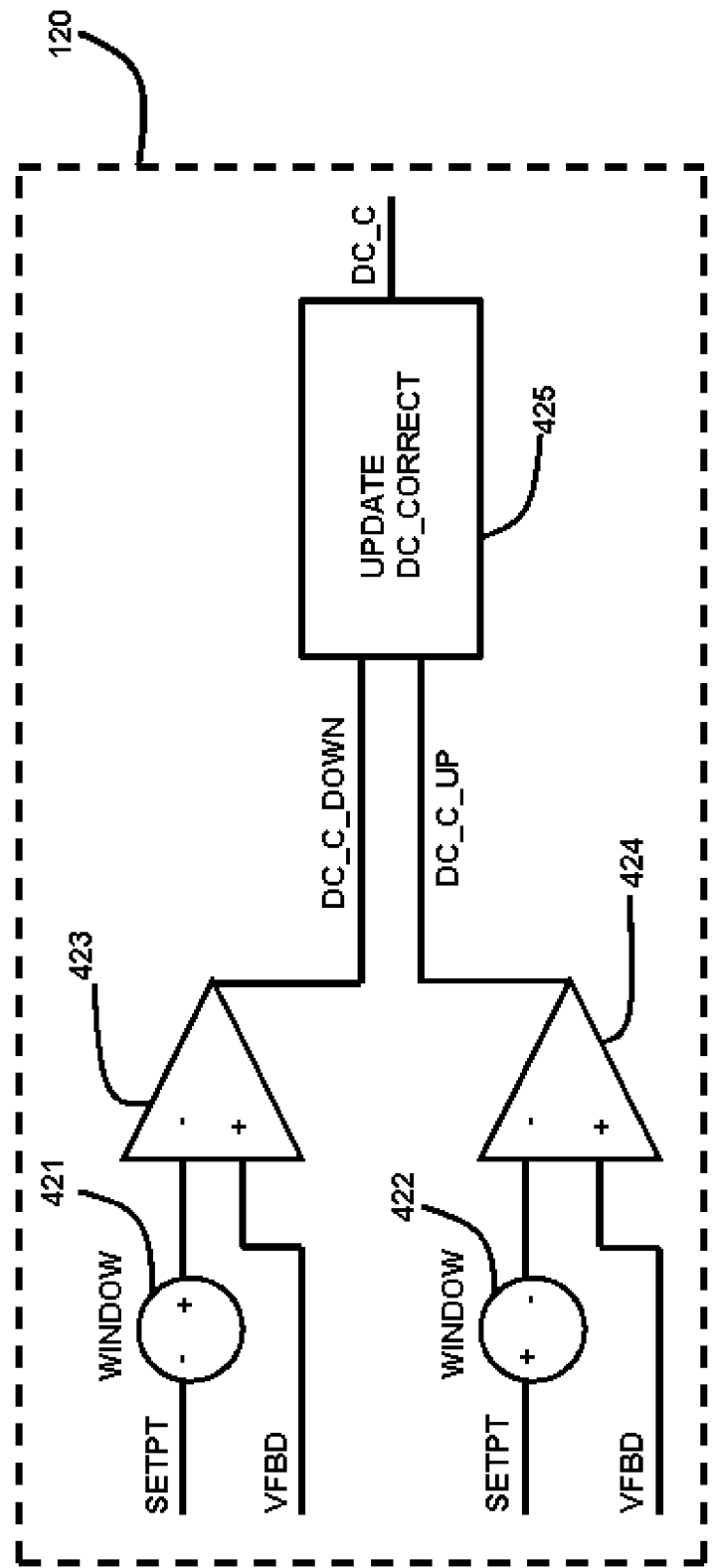
FIG. 4 is a circuit block diagram illustrating construction details of a DC correction block included in the controller of FIG. 1, in accordance with various embodiments.

FIG. 4 is a block diagram of DC CORRECT circuitry 120, in accordance with various embodiments. In various embodiments, the DC_C signal is used to remove the effect of the RAMP in DC regulation. DC_C is generated by comparing the feedback signal VFBD with a window around the setpoint signal SETPT defined by blocks 421 and 422 included in DC CORRECT circuitry 120. The comparators are blocks 423 and 424. The DC CORRECT circuitry 120 further includes UPDATE DC_CORRECT circuitry 425. The UPDATE DC_CORRECT block 425 updates signal DC_C according to the outputs of comparators 423 and 424. If VFBD is higher than the window around SETPT, DC_C signal is increased. If VFBD signal is lower than the window around SETPT, DC_C signal is decreased. If VFBD is within the window around SETPT, DC_C remains the same.

The RAMP is part of the overall control signal CNT_SIG that is used to generate the PHASE CLOCK pulses. RAMP is used as a stabilization signal to make the drive pulses TON1 to TONN evenly spaced during steady state operation. When the PHASE CLOCK signal is low, the ramp is rising. When PHASE CLOCK is high, RAMP is reset to 0. In various embodiments, RAMP is implemented digitally as a counter using PHASE CLOCK as a reset signal.

VFBA is the feedback signal. It is a scaled down version of the output voltage, in the illustrated embodiment. In the illustrated embodiment, VFBA is scaled down using the voltage divider defined by resistors R1 and R2. VFBA is the signal the controller uses to make corrections such that to maintain the output voltage within tolerance limits. VFBD is the digitized version of VFBA.

Figure 5:
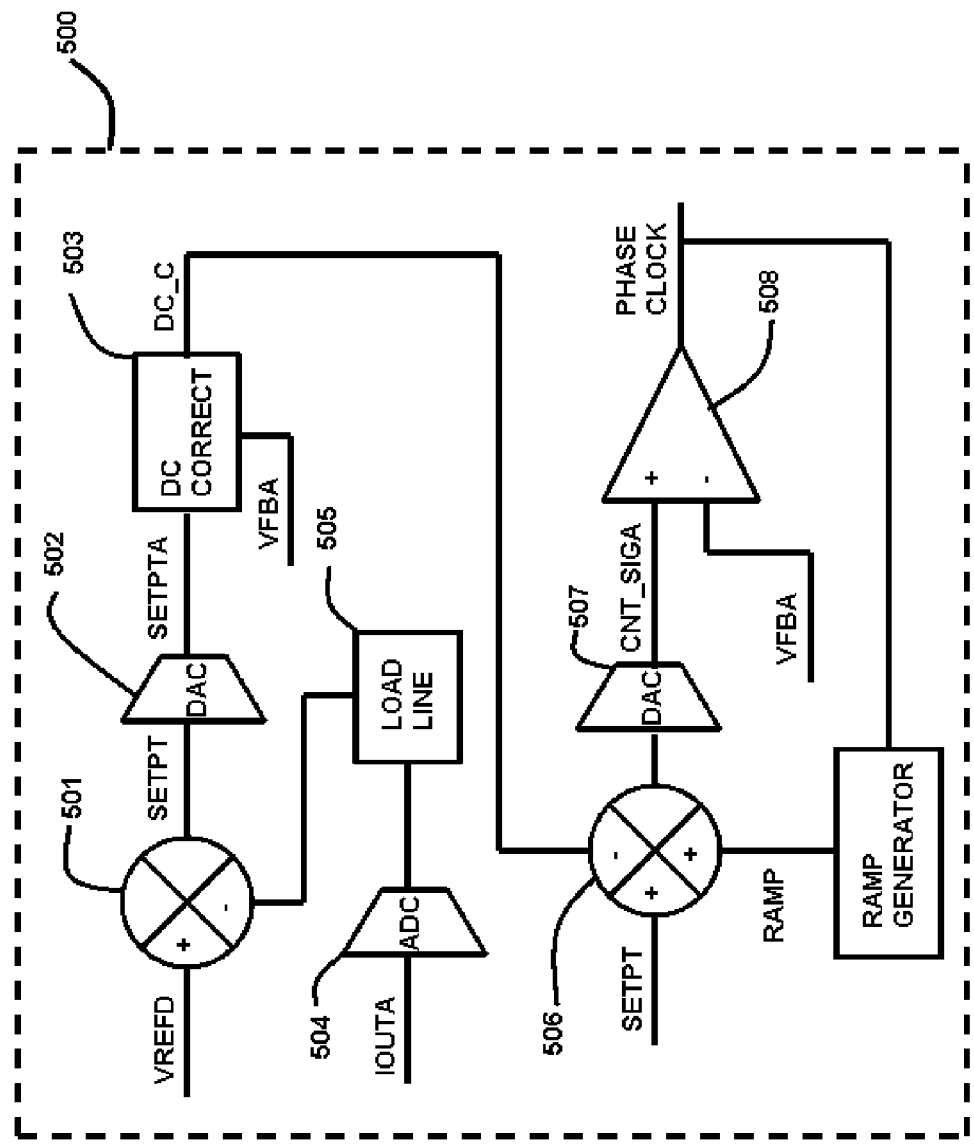
FIG. 5 is a circuit block diagram of a controller and a multiphase buck converter, in accordance with various alternative embodiments.

An alternative implementation, including more analog functions, is shown in FIG. 5. The digital SETPT signal is put through a digital-to-analog converter 502 to produce analog signal SETPTA. SETPTA is put to the analog DC CORRECT block 503. The analog DC CORRECT block is very similar to the block shown in FIG. 4. The difference is that the comparators 423 and 424 are analog ones instead of digital.

The arithmetic result of block 506 is put through another digital-to-analog converter 507 and compared to the analog feedback signal VFBA through comparator 508, which is an analog comparator. Block 508 creates the PHASE CLOCK signal. The rest operates as described in FIG. 1 above.

An advantage of the alternative implementation is that the analog feedback signal does not need to be digitized. The ADC needed to the feedback signal needs to be very fast in order for this architecture to work well. The current signal does not need to be as fast as the feedback voltage signal and a slower ADC can be used. The disadvantage is that two additional DACs are needed and analog signal processing is more prone to noise problems.

Figure 6:
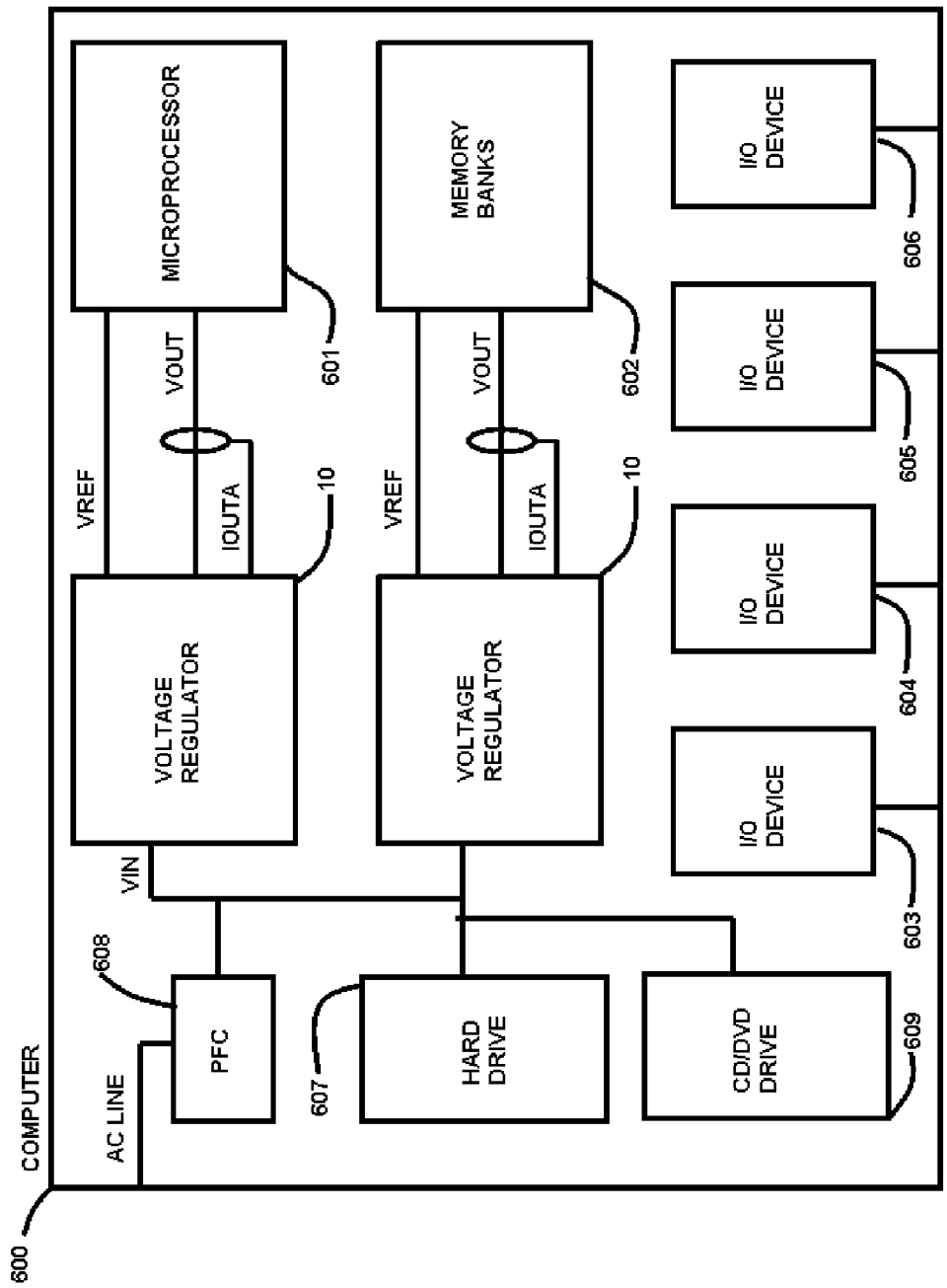
FIG. 6 is a circuit block diagram of a computer including the controller of FIG. 1, in accordance with various embodiments.

Various applications are possible for the system 10. For example, the system 10 can be used in a computer 600, as shown in FIG. 6. The computer 600 which can be a desktop computer; server; notebook computer; laptop computer; tablet computers; smart phone; or smart appliance in various embodiments. The computer 600 includes a processor 601 and memory banks 602 powered by voltage regulators 10. The computer 600 further includes I/O devices 603, 604, 605, 606, etc., coupled to the processor 601. The computer 600 further includes a long term memory 607, such as a hard drive or SSD, coupled to the processor 601 and coupled to the voltage regulators 10 to receive power from the voltage regulators. The computer 10 further includes a power factor correction device 608 coupled to the voltage regulators 10 to supply power to the voltage regulators 10. The device 608 is coupled to AC power, in the illustrated embodiment, in operation. Other conventional computer components are also included, as desired, such as CD/DVD drive 609.

Figure 7:
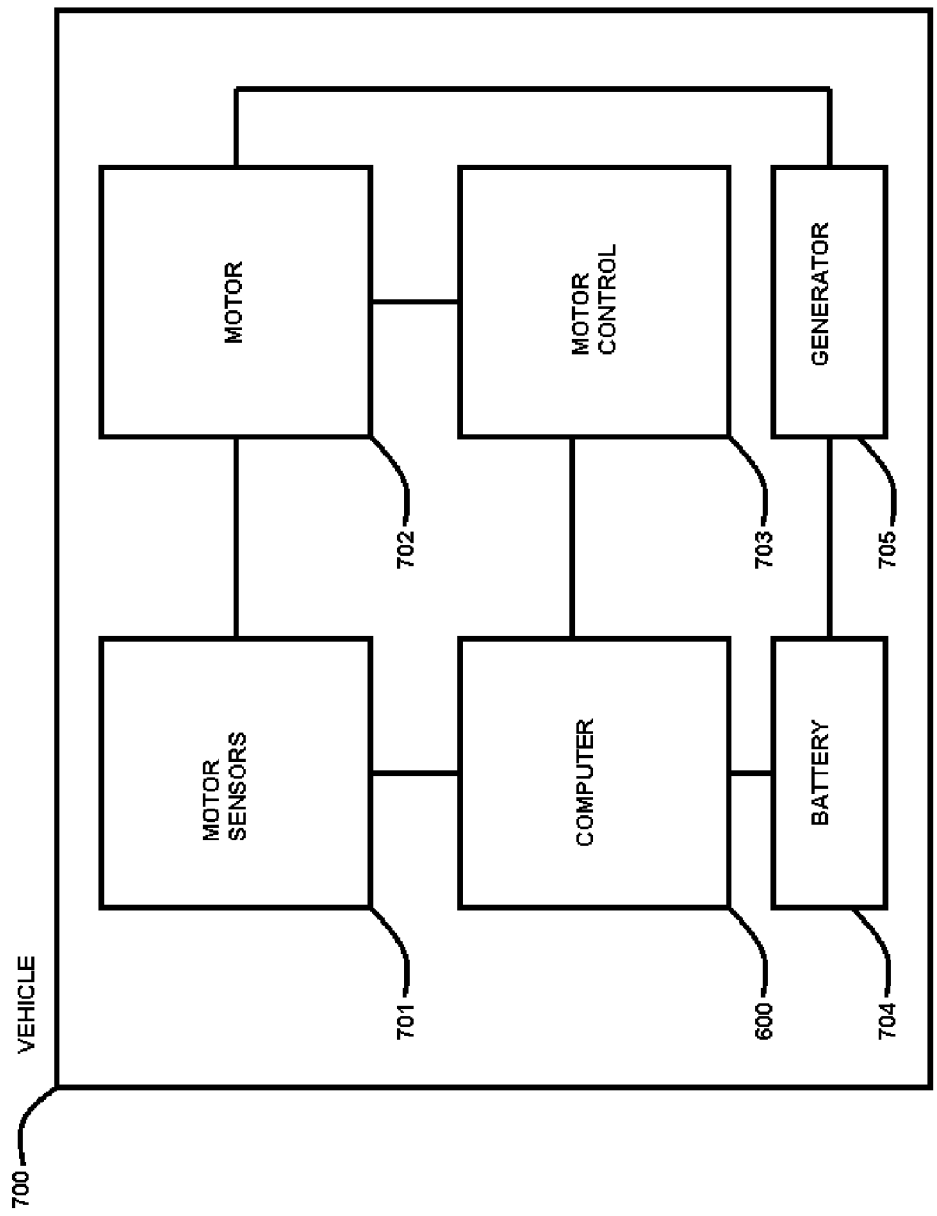
FIG. 7 is a circuit block diagram of a vehicle including the computer of FIG. 6, in accordance with various embodiments.

The system 10 is also be used in all sorts of vehicles in various embodiments, including land vehicles, such cars, trucks, busses, motorcycles, particularly vehicles that have engine management systems; electric vehicles; airplanes, particularly in avionics systems such as navigation systems, control systems, communication systems, collision avoidance systems, and passenger entertainment systems; marine vehicles such as aircraft carriers, submarines, and boats, particularly in navigation, control, and weapon systems; and anywhere that a processor is used in a mixed voltage environment. For example, the computer 600 can be used in a vehicle 700, as shown in FIG. 7. In various embodiments, the vehicle 700 includes a motor or engine 702, such as an internal combustion engine, an electric motor, a hybrid engine, or other sort of motor. The vehicle 700 further includes one or more motor sensors 701, coupled to the motor 702, for sensing parameters of the motor 702 such as, for example, air/fuel ratio, ignition timing, idle speed, engine coolant temperature, engine knock, variable valve timing, or other engine parameters. See, for example, U.S. Pat. No. 4,306,529 to Chiesa; U.S. Pat. No. 8,498,768 to Goto; U.S. Pat. No. 8,452,465 to Sinha; U.S. Pat. No. 8,264,376 to McLoughlin, and U.S. Pat. No. 4,649,484 to Herzog, all of which are incorporated herein by reference. The vehicle 700 further include the computer 600 of FIG. 6 coupled to the motor sensors 701 to analyze the data received from the sensors. The vehicle 700 further includes one or more motor controls 703 coupled to the motor 702, to affect operation of the motor 702 by changing parameters of the motor. The computer 701 causes the motor controls 703 to affect operation of the motor 702 in response to the parameters sensed by the sensors 701, to improve engine operation. In some embodiments, a generator or alternator 705 is driven by the motor 702 and charges the battery 704 when the vehicle is in operation. Other standard vehicle components are also included.

Thus, some embodiments provide a controller and method that minimizes delay because it does not wait for the next pulse to be issued in its allotted slot as in a fixed frequency converter, nor does it use a compensated error amplifier or PID compensator in its loop. PID compensators introduce delay. Therefore, some embodiments provide a control architecture and method that can meet load DC and transient requirements with minimal output capacitance. Some voltage regulator architectures require a lot of output capacitors. Using the multiphase buck converter architecture described herein, the number of SP output capacitors is reduced from eight to four capacitors, in some embodiments, for a load line of about 0.75 mOhm.

Some embodiments provide a controller and method that use one arbitrary stabilization ramp signal to drive multiple phases of a buck converter. The RAMP signal does not have to mimic the inductor current or other characteristics of the buck converter. This allows for more versatility in implementation. If the RAMP signal were not present the phase clock timing would be irregular resulting in non-optimal switching of the converter phases. This would cause excessive output voltage ripple, unbalanced phase current and otherwise unstable operation.

The introduction of RAMP signal makes PHASE CLOCK pulses come at regular intervals, which makes the drive pulses evenly spaced. This is the intended operation of the buck converter, because the output voltage ripple is minimized, phase current is balanced among the phases and the converter operates in stable mode.

Another benefit of using RAMP is the improvement in transient response. The controller described here does not use an error amplifier or PID compensator in its loop. It provides accurate DC regulation through the DC_C signal. This architecture minimizes the response time to a transient event and it can meet the output voltage requirements of modern processors with significantly less output capacitance.

While certain functions are illustrated as being performed in certain blocks, it should be understood that various functions may be performed in other blocks or in a combination of blocks. The blocks do not necessarily correspond to software functions or routines, to integrated circuits or to circuit blocks. Multiple blocks may be defined by a single function, routine or integrated circuit or a single block may be defined by multiple functions, routines or integrated circuits.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments.

I claim:

1. A controller for a multiphase buck converter, configured to control a predetermined number of power stages defining an output voltage, the controller comprising:
   a voltage supply input;
   a control loop including a feedback voltage input configured to receive a feedback voltage proportional to output voltage;
   a setpoint voltage input configured to receive a setpoint voltage that represents desired output voltage, the setpoint voltage including a DC error voltage;
   circuitry configured to subtract the DC error voltage from the setpoint voltage to define a low voltage;

a ramp generator configured to generate a periodic repeating ramp signal that ramps from the low voltage to the feedback voltage then resets to the low voltage;

a phase clock coupled to the ramp generator and configured to generate a pulse each time the repeating ramp signal resets to the low voltage;

a phase counter coupled to the phase clock and configured to count each time a pulse is generated by the phase clock and to restart the count when the predetermined number is reached; and a time on block having an input coupled to the phase counter and configured to turn on respective of the power stages when the counter is at predetermined count values;

wherein no PID compensator or compensated error amplifier is used in the control loop between the output voltage and the feedback voltage input.

2. A controller in accordance with claim 1 wherein the phase counter counts up.

3. A controller in accordance with claim 1 wherein the time on block is configured to turn on a first one of the power stages when the counter is at a value representing a count of 1 and to turn on a second one of the power stages when the counter is at a value representing a count of 2, and wherein the counter is configured to continue counting and turning on different ones of the power stages until the predetermined number is reached and then start again from 1.

4. A controller in accordance with claim 1 wherein the ramp generator reaches the feedback voltage more quickly when the feedback voltage drops.

5. A controller in accordance with claim 1 and including an adder configured to add the ramp signal to the low voltage to define a control signal output, wherein the phase clock is defined by a comparator configured to compare the control signal to the feedback voltage and to generate the phase clock pulse in response.

6. A controller for a multiphase buck converter, configured to control a predetermined number of power stages defining an output voltage, the controller comprising:

a voltage supply input;

a control loop including a feedback voltage input configured to receive a feedback voltage proportional to output voltage;

a setpoint voltage input configured to receive a setpoint voltage that represents desired output voltage; and a ramp generator configured to generate a repeating ramp signal that ramps from a first voltage to the feedback voltage then resets to the first voltage, the ramp generator reaching the feedback voltage at faster intervals when the feedback voltage drops relative to the setpoint voltage, the power stages being turned on more frequently responsive to the ramp generator reaching the feedback voltage at faster intervals;

wherein no PID compensator or compensated error amplifier is used in the control loop between the output voltage and the feedback voltage input.

7. A multiphase buck converter including the controller of claim 6, and including power stages and respective inductances.

8. A multiphase buck converter in accordance with claim 7 and having no more than four output capacitors when the load line is about 0.75 mOhm.

9. A multiphase buck converter in accordance with claim 7 and further including a phase clock coupled to the ramp generator and configured to generate a pulse each time the repeating ramp signal resets to the low voltage.

10. A multiphase buck converter in accordance with claim 9 and further including a phase counter coupled to the phase clock and configured to count each time a pulse is generated by the phase clock and to restart the count when the counter has counted a number of times equal to the predetermined number of power stages.

11. A multiphase buck converter in accordance with claim 10 wherein the counter counts up starting from a value of one.

12. A computer including a processor and a memory coupled to the processor, the computer including the multiphase buck converter of claim 7 coupled to power the processor and the memory.

13. A vehicle having an engine, a battery, a sensor configured to sense an operating parameter of the engine, and an engine control computer coupled to the sensor and configured to adjust operation of the engine in response to the sensed parameter, the engine control computer including a processor and a memory coupled to the processor, the engine control computer including the multiphase buck converter of claim 7 coupled to receive power from the battery and coupled to supply power to the processor and the memory.

14. A method of controlling a multiphase buck converter configured to control a predetermined number of power stages defining an output voltage, the method comprising:

receiving an input voltage from a voltage supply;

receiving a feedback voltage signal, at a feedback voltage input, proportional to output voltage;

receiving a first voltage signal that represents desired output voltage;

generating a repeating ramp signal that ramps from a first voltage to the feedback voltage then resets to the first voltage, the ramp reaching the feedback voltage at faster intervals when the feedback voltage drops relative to the first voltage signal; and turning on the power stages on more frequently responsive to the ramp generator reaching the feedback voltage at faster intervals;

wherein no PID compensator or compensated error amplifier is used between the output voltage and the feedback voltage input.

15. A method in accordance with claim 14 and further comprising generating a pulse each time the repeating ramp signal resets to the low voltage.

16. A method in accordance with claim 15 and further comprising counting each time a pulse is generated by the phase clock and restarting the count when the counter has counted a number of times equal to the predetermined number of power stages.

17. A method in accordance with claim 16 wherein the counting comprises counting up starting from a value of one.

18. A method in accordance with claim 14 and further comprising receiving an output current signal that represents output current, generating a load line signal proportional to output current, and subtracting the load line signal from a reference voltage signal indicative of desired voltage, to generate the first voltage signal.

19. A method in accordance with claim 14 wherein the load line signal and first voltage values are digital signals.

20. A method of computer comprising supplying power to a processor and to a memory using the method of claim 14.

* * * * *